July 4, 1950

G. B. LITCHFORD ET AL 2,513,338

DIRECTIVE ANTENNA SYSTEM

Filed Nov. 1, 1943

INVENTORS
G. B. LITCHFORD
W. B. DAY
BY
ATTORNEY.

INVENTORS
G. B. LITCHFORD
W. B. DAY

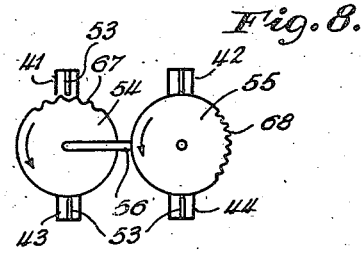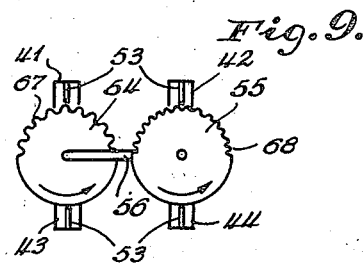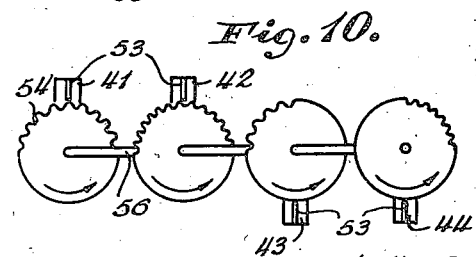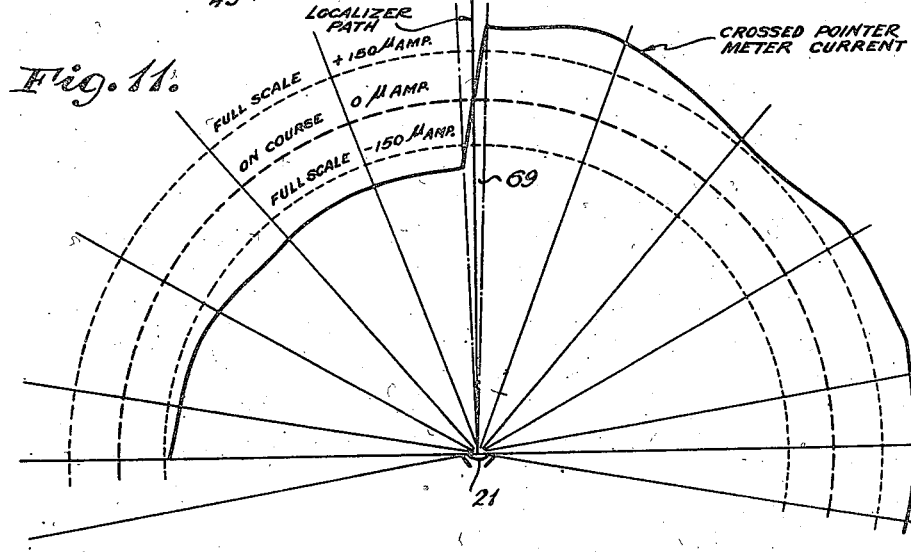

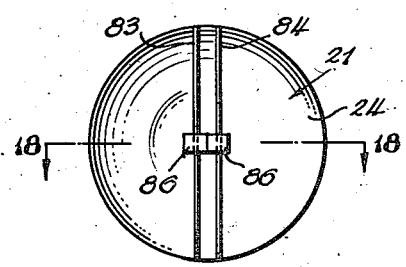
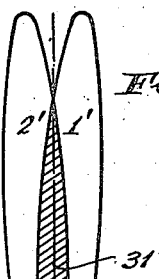
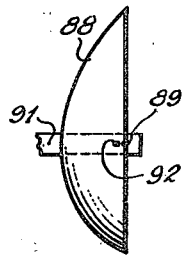
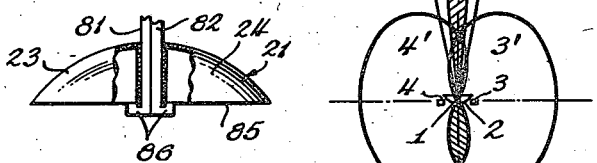
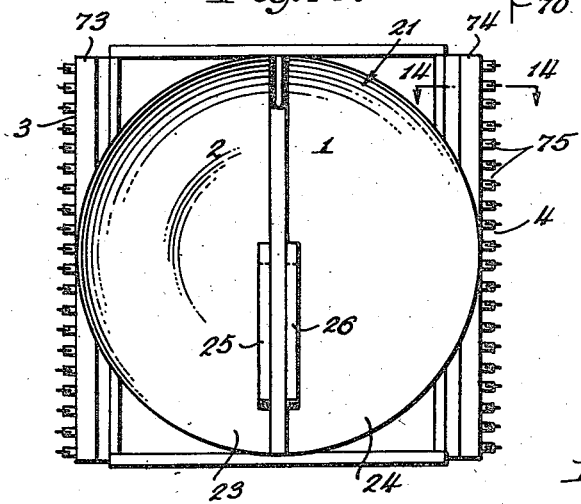
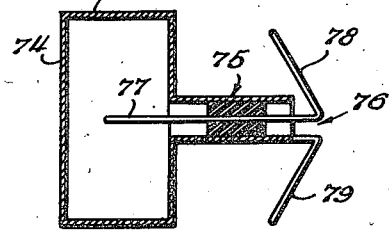
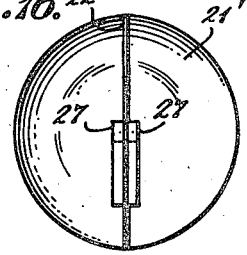
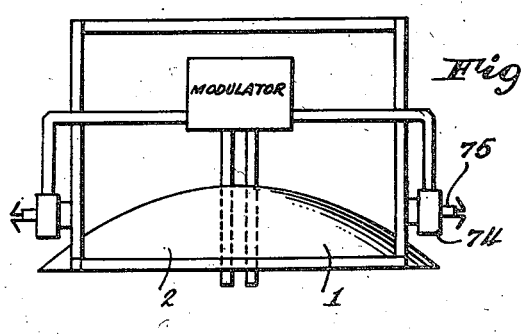

Patented July 4, 1950

2,513,338

UNITED STATES PATENT OFFICE 2,513,338

DIRECTIVE ANTENNA SYSTEM

George B. Litchford, Hempstead, and William Baldwin Day, Mineola, N. Y., assignors to The Sperry Corporation, a corporation of Delaware Application November 1, 1943, Serial No. 508,496

41 Claims. (Cl. 343—109)

The present invention relates to directive antenna systems and more particularly to methods of and apparatus for defining a course for radio range and instrument landing purposes.

While the present invention may be employed in any system requiring a sharply defined path, as for radio range purposes, the system herein has been shown applied to the localizer path of an equi-signal type instrument-landing system to simplify the illustration.

One of the more important limitations militating against presently known localizer systems resides in the fact that the pilot gets no reliable indication of his bearing relative to the path until he is quite close to the relatively narrow beams defining the path. If the beams are broadened to overcome this defect, the receivers tend to become less sensitive to departures from the course. Furthermore, if the beams are broadened so as to cover a wider field, the energy radiated at large angles from the localizer path strikes buildings, trees, and other obstructions close to the radiating source, causing undesirable reflections that create interference patterns.

It is customary to separately modulate and to alternately switch on and off the respective beams defining the equi-signal path, but even in this case some interaction occurs, and the generation of side lobes makes it extremely difficult to avoid the formation of cross-over points resulting when the lines defining the field strength of the respective beams intersect one another. Such cross-overs are exceedingly undesirable since they create treacherous inverse courses that cause the pilot to lead his craft away from the course rather than toward it.

The foregoing problems have been overcome in a satisfactory manner in the present improved system by providing a composite beam having a pair of principal beams offering the desired sensitivity along the course or path and having combining auxiliary beams which provide wide angle coverage. The latter are adjusted to a lower average field intensity so as to preclude formation of serious reflections. The use of two pairs of beams permits adjustment of the pattern shape and of the field intensity of the individual patterns relative to one another. By adjusting these and the relative orientation of the patterns, the cross-over points that form the inverse courses may be eliminated.

The objects of the present invention are: to provide an antenna system overcoming one or more of the foregoing disadvantages; to provide an improved localizer or radio range beam system, utilizing a number of separate suitably oriented antennas; to provide in such a system, improved means for characteristically modulating the energy to the respective beams and for controlling the flow of energy to the respective antennas, so that each beam is operative during only a portion of a recurrent switching cycle; to provide means for forming two spaced beams from a single concave reflector in an improved manner; to provide a method of and apparatus for disposing the radiators so that they may be energized simultaneously with a minimum of interference between the resultant beams; to provide an improved localizer system defining a principal path and shorter range but fully serviceable reciprocal path for guiding pilots to the principal path; to provide an improved equi-signal system, wherein the field strength ratios between the beams to the right and left respectively of the desired path exceed a predetermined minimum value at all points remote from the equi-signal path.

These and other objects of the present invention will become more apparent from the following description and accompanying drawings, showing the manner in which the principles of the invention may be incorporated in an actual instrument landing system.

Figure 6:
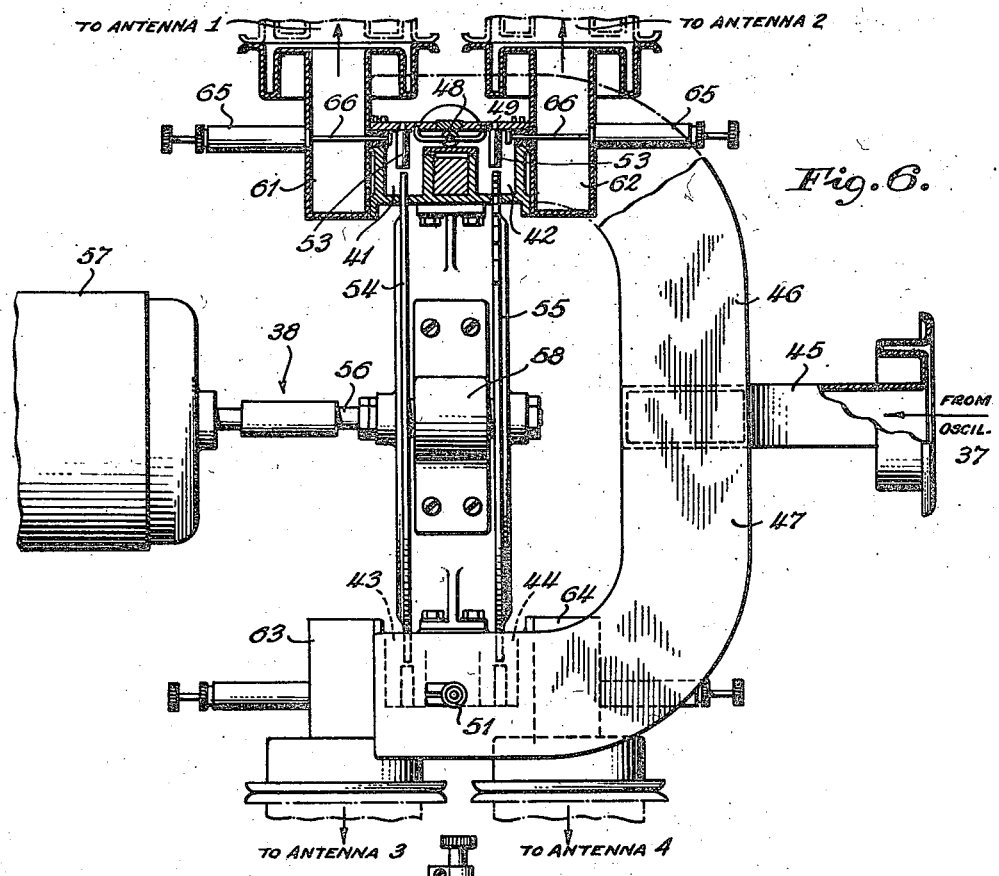
Figs. 6 and 7 are plan and side elevational views, with parts in section, of the modulating and switching device utilized in energizing the respective radiators.
Figure 7:
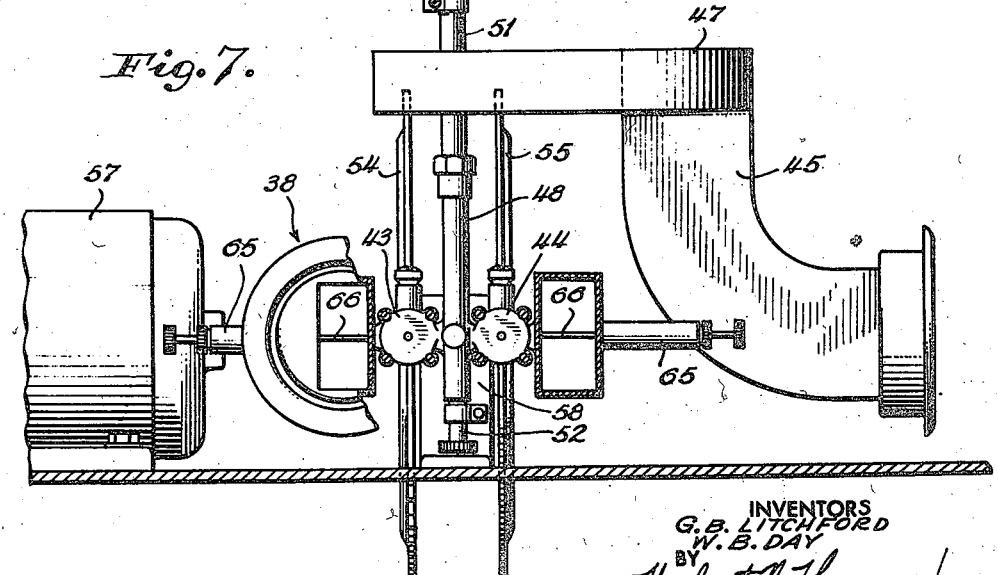

Figs. 8, 9 and 10 are diagrammatic views illustrating various forms of modulator wheels that may be used with the apparatus of Figs. 6 and 7, to provide operation as shown in the graphs forming Figs. 8a, 9a and 10a respectively.

Fig. 11 is a graph illustrating the cross-pointer meter reactions obtained at various angular positions of the craft relative to the transmitting station.

Figure 3:
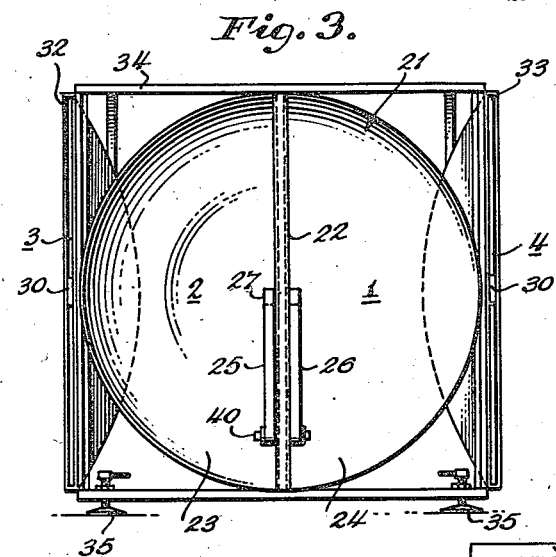
Figs. 3, 4 and 5 are front, side and plan views, respectively, of an antenna or radiator array, useful in producing a pattern of the type shown in Fig. 1.
Figure 4:
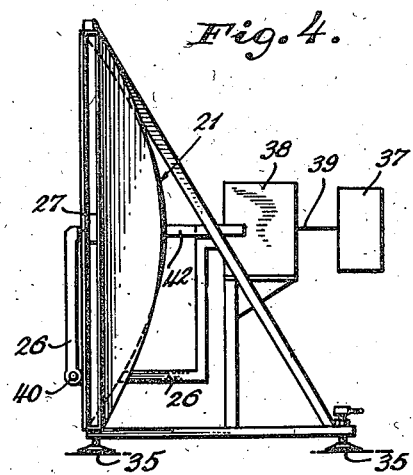
Figure 5:
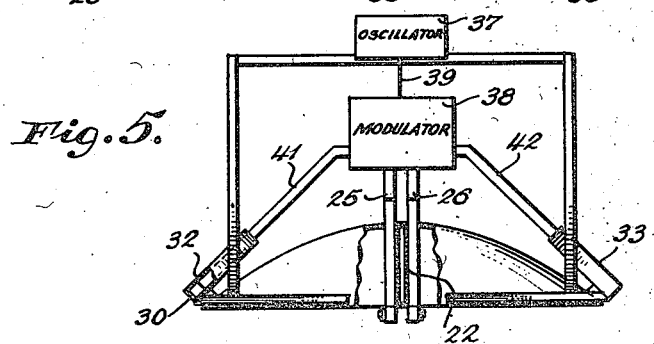

Fig. 12 is a diagram of a pattern which might be obtained with an apparatus of the general type shown in Figs. 3, 4 and 5, but wherein use is made of slightly different auxiliary radiators.

Fig. 13 is a front elevational view of a radiating system capable of producing a pattern similar to that shown in Fig. 12.

Fig. 14 is a sectional view taken on the line 14—14 of Fig. 13.

Fig. 15 is a plan view of the apparatus shown in Fig. 13.

Fig. 16 is a front elevational view of a concave reflector of the general type shown in Figs. 3 and 13, but wherein energy-emitting means are disposed in abutting relation.

Fig. 17 is a front elevational view of a concave reflector of the general type shown in Figs. 3 and 13, but wherein the wave guides extend between the partitions.

Fig. 18 is a sectional view taken on the line 18—18 of Fig. 17.

Fig. 19 is a vertical sectional view of a paraboloid wherein the bottom section is foreshortened to increase the vertical vertical radiation.

Generally speaking, the present invention comprehends forming two closely adjacent slender beams defining an equi-signal path, and a pair of broad or wide angle auxiliary beams providing low power coverage at points angularly remote to the left and right of the principal path. One of each pair of beams thus are directed principally to the right of the path, and are modulated in a manner distinctive from the remaining beams which are directed principally to the left. The energy forming the individual beams may be commutated so that only one or two radiators are active at a time. The respective radiators are oriented so that the action of the crossed-pointer meter represents a substantially linear function of angular departure from the course or path within predetermined limits, and maintains a constant full scale deflection at all further increases in departure. This result is obtained by maintaining at least a predetermined ratio in the field strengths of the respective right and left patterns at all points at which full-scale readings of the cross-pointer meter are desired.

In apparatus that has been constructed and operated satisfactorily, use has been made of a concave reflector or transducer 21 having an electrically conductive partition 22 extending perpendicularly from the concave surface of the reflector so as to divide the reflector into two adjoining portions 23 and 24. Preferably the reflector 21 comprises a metallic body having a concave surface of revolution adapted to collimate or concentrate the energy conducted thereto. Excellent results have been obtained with a paraboloid spun from sheet aluminum having an aperture or discharge diameter of approximately 6 feet, and a depth of one-quarter the aperture diameter. The partition 22 extends from the concave surface in a plane perpendicular to the directrix of the parabolic curve, or a plane parallel and adjacent to such plane. The partition, when disposed vertically as shown in Fig. 3, reduces the directivity of the reflector 21 in a horizontal plane, energy being fed to both portions 23 and 24 in a manner to be described. By employing the partition, advantage is taken of the ease and precision favorable to the production of a parabolic reflector, and the efficiency normally obtained in its operation, without having the resultant beam or beams so narrow as to render the system too critical.

Energy is fed to each portion 23 and 24 through a wave guide or similar electromagnetic energy conduit 25 and 26, each having a mouth or exit portion 27 laterally displaced from the reflector focus. The angular displacement of the resultant beams is determined largely by the lateral displacement of the mouths 27 from the focus, though a similar effect has been found to be obtainable by shifting the mouth 27 toward or from the plane of the paraboloidal aperture as by pivot 40. Better results have been obtained in forming localizer patterns when the electromagnetic energy is horizontally polarized, obtained by orienting the wave guides so that the electric field vectors therein extend horizontally. With horizontal polarization, fewer difficulties are encountered with ground reflections, and the patterns accordingly are less affected by changing ground conditions. It has been found that interference effects are produced by undesirable reflections from the partition 22 when the mouths 27 are spaced laterally from the partition. These effects were overcome when the partition was placed in adjoining relation to each mouth 27 in the manner shown in Fig. 3. While this may be done with a single thick partition, it was found to be more convenient to provide a partition with separated walls laterally spaced from the focus until each one abuts against a wave guide mouth 27. The wave guides 25 and 26 extend to a source of modulated radio frequency energy, as will appear. Radio frequency energy is discharged from the mouths 27 against the portions 23 and 24 forming antennas 1 and 2. The energy radiated from the portion 23 forms the slender, high-intensity right beam 26, while the portion 24 forms the slender, high-intensity left beam 29, both as seen by the pilot when approaching the transmitter.

Figure 1:
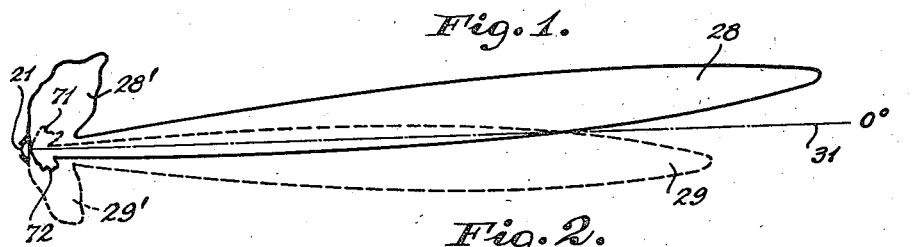
Fig. 1 is a polar coordinate curve of the horizontal field strength pattern of a localizer system wherein the radius vector represents the detected power throughout an azimuthal range of 180°.

As shown in Fig. 1, the beam 28 includes a low intensity appendage 28' providing radiation over a relatively large angle to the right of the equi-signal path 31. In like manner, coverage over a wide angular range is provided for the left beam by an appendage 29'. The average field strength, at a given distance, of the energy radiated within the zone defined by appendages 28' and 29' is considerably less than the average field strength of the energy radiated within the beams 28 and 29, thereby reducing undesirable reflections occurring from obstructions in the neighborhood of the transmitter and such as would have a detrimental effect on the shape of the patterns 28 and 29.

Figure 2:
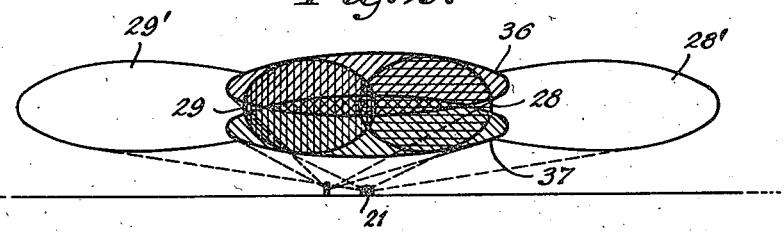
Fig. 2 is a diagram representing a vertical plane cross section taken perpendicular to the localizer course through the respective beams forming an instrument landing system, wherein the localizer beams of Fig. 1 are superimposed on a pair of guide path beams.

The pattern represented by the appendages 28' and 29' may be formed by any suitable antenna or radiating system having less directivity than that provided by the paraboloid 21. Satisfactory results have been obtained with a pair of cylindrical parabolas 32 and 33 oriented relative to the paraboloid in the manner illustrated in Figs. 3, 4 and 5, to form auxiliary antennas 3 and 4. The parabolas 32 and 33 may have an aperture height approximately equal to the diameter of the reflector 21, and a width suitable for providing the necessary wide angle coverage. In one form of apparatus, satisfactory results were obtained with a parabola width of approximately three-quarters of a wave length. The parabolas 32 and 33 may be energized in any conventional manner. Good results were obtained by feeding through the back of each parabola with a wave guide 41, 42 or conventional concentric cable rather than blocking the reflector opening with a relatively large wave guide in the manner employed for the radiators 23 and 24. A deflector 30 is disposed at the aperture so as to distribute the energy over the reflecting surface. The reflector 21 and the parabolas 32 and 33 may be suitably mounted in a single frame 34 as shown, and elevating screws 35 may be disposed at the supporting points to provide the desired angular orientation in a vertical plane. It is common practice to elevate the axis of the reflector 21 so that it points upwardly at an angle of the order of several degrees to the horizontal. Such an angular adjustment assists in aligning the beams so that the energy is concentrated in a useful region along radiation patterns 36 and 37, defining the glide path as shown in Fig. 2. The glide path beams overlap in the vertical plane to define an equi-signal path for the vertical component of the instrument landing or other course, and function on the receiver in a manner similar to the localizer beams, except of course, that they react on the vertical position-indicating pointer rather than the horizontal-position-indicating pointer in the case of the localizer. The glide path provisions, however, are conventional and require no further discussion here, reference being made to W. T. Cooke et al. Patent 2,307,023.

It will be seen that the energy from antennas 1 and 3 cooperate to form a composite beam, the principal portion of energy of which is directed to the left side of the localizer path. Likewise antennas 2 and 4 cooperate to form composite beams for the right side of the path in each case, as viewed by the pilot approaching the station. The cooperative relation between the respective portions of the beam is enhanced by modulating the left side portions in a manner distinct from the right side portions. For example, it has been customary in localizer work to modulate the left beam 29, 29' at 600 cycles per second, and the right beam 28, 28' at 900 cycles per second, which modulation components are detected and separated from the carrier at the receiver, where they act in opposition on a crossed-pointer meter in a manner well known in the art. A typical arrangement by which a pilot may determine his position relative to an instrument landing course, as indicated on a suitable meter, is shown in the aforementioned Patent No. 2,307,023.

Radio frequency energy may be generated in a source such as an oscillator 37 of any conventional design. Successful use has been made of a velocity modulation tube providing energy having a wave length of the order of 10 centimeters. The energy is fed in any convenient manner to a modulator 38 along a conventional conduit 39 schematically shown in Figs. 4 and 5, but which may comprise a wave guide or the like. The modulator may be of any conventional design capable of directing the energy to the respective radiators and capable of modulating the energy for the respective beams in a characteristic manner. Preferably the modulator includes a switching device that permits the energy to be directed alternately to successive antennas or successive pairs of antennas. In this manner, energy may be conducted along wave guides 25 and 26 during one portion of a cycle and along wave guides 41 and 42 during another portion of the cycle.

A modulator 38 that has operated satisfactorily both to characterize the radiated energy and to provide the necessary switching is shown in detail in Figs. 6 and 7. Such a modulator provides four resonant chambers 41, 42, 43 and 44 disposed at equal distances from a source of radio frequency energy, which chambers are periodically detuned at the desired modulation frequency rates to impart the proper identifying characteristic to the carrier energy, and also to interrupt periodically the flow of energy from the source to the respective radiators. The modulator chambers are each normally resonant to the frequency of the radio frequency carrier energy. Energy travelling along a wave guide 45 from the oscillator 37 divides along two branches 46 and 47, each having a suitable coupling device 48, for linking the branches with the respective resonant chambers, as shown in Figs. 6 and 7. Such a device 48 may comprise a concentric line having one terminal extending within the branch and having a coupling loop 49 or similar element, at the opposite end within the respective chambers. It will be apparent that the energy travels along similar paths to each of the chambers, so that all chambers might resonate in phase. Impedance matching devices 51 and 52 may be provided as shown in Fig. 7, to obtain optimum performance of the coupling device 48.

Each of the chambers is provided with a reentrant portion or post 53, which cooperates with the peripheral surface of a modulator wheel 54 or 55 to vary the resonant frequency of each chamber. The wheels 54 and 55 are provided about at least a portion of their peripheries with a series of teeth, notches, undulations, or the like, capable of cooperating with the portions 53 to periodically tune and detune the respective chambers. The wheels 54, 55 may be supported on a shaft 56 rotated at a constant speed by motor 57 within a bearing 58.

Energy may be coupled from the resonant chambers to the respective antennas by connecting the resonant chambers to suitable electromagnetic energy conduits such as wave guides 61, 62, 63 and 64, respectively. Suitable energy pick-up devices 65 having probes 66 are shown extending through the wave guides to the respective resonant chambers, the inner end of each such probe is provided with a capacitative or inductive element for absorbing a portion of the energy within the chamber for conduction to the adjoining wave guide. The energy is conducted from the guides 61 to 64, inclusive, along preferably equal length conduits to antennas 1 to 4, inclusive, comprising in this instance the reflectors 24, 23, 32 and 33, respectively.

In operation, the wheels 54 and 55 rotate at a constant or synchronous speed. The chambers are alternately tuned and detuned by the change in the gap between the post 53 and the wheel periphery at a rate dependent upon the number of teeth in the periphery of the wheels and the speed of rotation. The teeth preferably are formed generally sinusoidally, so that the frequency characteristics of the chambers varies smoothly. The chambers preferably are arranged to resonate at the oscillator frequency when a substantial distance intervenes between the post 53 and the periphery of the wheels 54 or 55, a condition occurring when the trough of a tooth adjoins the post 53. At this instant, the chamber resonates freely and a considerable amount of energy therein is absorbed by the probe 66 and conducted to the adjoining wave guide. Detuning progresses as the crest of the tooth approaches the post 53. When the clearance approaches a minimum, the chamber is sufficiently detuned as not to resonate to any appreciable degree, and accordingly little or no energy is absorbed by the probe 66. It will be apparent that by varying the space between the post 53 and the periphery of the wheel 54, 55 at a uniform periodicity, e. g. at 600 or 900 cycles per second, the energy conducted to the respective antennas may be modulated in an easy controllable manner at corresponding frequencies. It is likewise obvious that by providing a narrow spacing between the parts over an appreciable period of rotation, the modulator acts as a switch to shut off the energy to any desired antenna during a desired interval.

Various arrangements for the wheels 54 and 55 to provide different types of modulation are shown in Figs. 8, 9 and 10. It will be apparent from these figures and from Fig. 6 that the resonant chambers 41 and 42 are disposed diametrically opposite chambers 43 and 44, respectively. Advantage is taken of this arrangement to modulate two separate antenna currents with a single wheel, as will become apparent. In order to obtain 600-cycle and 900-cycle modulation, use may be made of a motor 57 operating at a synchronous speed of 1800 R. P. M. for rotating wheels 54, 55 having five teeth and seven and one-half teeth per quadrant, respectively. It is desirable to complete the eighth tooth into the adjoining quadrant in the case of the wheel 55, so as not to have any sharp discontinuities in the toothed surface. The teeth 67 in wheel 54 and the teeth 68 in wheel 55 cooperate with the resonant chambers to provide 600 cycle and 900 cycle modulation, it proving immaterial that antennas 2 and 4 are modulated for slightly longer periods than antennas 1 and 3, as when the teeth in wheel 55 extend beyond a quadrant. If difficulty due to unbalance should be encountered in this respect, an integral number of teeth may be formed within a single quadrant of wheel 55, thereby changing the higher modulation frequency. Alternatively, if any such difficulty should be encountered, correction may be made by slight adjustment in the gain of the respective circuits in the receiver to compensate for the unequal modulation periods. In practice no correction has been required.

Fig. 8a illustrates the sequence of operations occurring during a single switching cycle. The modulated waves generated by antennas 1, 2, 3 and 4 are shown for the portions of each switching cycle or period during which they are operative. Thus assuming the wheels 54 and 55 to be arranged as shown in Fig. 8, and with the wheels rotating in the direction indicated by the arrow, energy is fed during a first quarter of a period at 600 cycles to antenna 1, followed by 900 cycle modulation during the following quarter to antenna 2. During this interval of one-half period, the toothed portion of wheel 54 has progressed through one-half of a revolution from the chamber 41 to the chamber 43 and hence during the ensuing quarter period provides 600 cycle modulation to antenna 3. At this point, the toothed portion of wheel 55 has progressed from the chamber 42 to the chamber 44 and provides 900 cycle modulation to antenna 4 during the last quarter of the period. It thus is apparent that with but two wheels of the type shown in Fig. 8, each of four antennas may be successively modulated at one of two different modulation frequencies, during a quarter cycle, during which quarter all of the remaining antennas are inoperative. Although the chambers 41 and 43 and chambers 42 and 44 are shown disposed on diametrically opposite parts of the wheels 54 and 55, respectively, it is apparent that this relation may be varied to change the cycle of operations so that the respective antennas are energized in a manner other than during four equally spaced intervals.

In Fig. 9, the wheels 54 and 55 are provided with teeth 67 and 68 throughout half of the periphery, and the wheels are oriented relative to one another that the modulation portions of each cycle are in phase. Accordingly, with the resonant chambers disposed as shown diagrammatically in Fig. 9, antennas 1 and 2 are modulated in unison at 600 and 900 cycles, respectively, during one half of a switching period, while antennas 3 and 4 likewise are modulated in unison during the remaining half of the period. Accordingly, each antenna radiates during one half of the time, as depicted in Fig. 9a, rather than during one quarter of the time as depicted in Fig. 8a, thereby resulting in greater sensitivity of the receiving equipment to departures toward and from the course.

It is generally recognized that interference patterns result when two sources of radio frequency energy form overlapping beams while the sources operate in unison. It has been found, however, that antennas 1 and 2 work satisfactorily in unison as shown in Fig. 9a, provided the conduits to the respective antennas are electrically balanced so that no disturbing phase unbalance results, and provided further that the waves forming each beam originate from sources so closely spaced so as to constitute, in effect, a single source. With the wave guide mouths 27 spaced a fraction of a wave length apart, and with a narrow partition separating them, as shown in Fig. 3, antennas 1 and 2 produced no undesirable interference patterns, especially when the angle included within the beams was small. Hence, with narrow beams disposed adjacent one another, as shown in Fig. 1, so that the included angle is small, both principal beams may exist at the same time without producing undesirable interference effects. The interference effects are minimized with adjoining narrow beams, the width of each of which at the half-power points may be 10° or less, with an included angle between maximum points of the same order. By having the beams cross at about the 60% power point, the included angle may be only several degrees. The angle included between outermost half-power points preferably is held to within 20°. Likewise, as illustrated in Fig. 9a, both auxiliary beams may be energized in unison since the patterns are so widely divergent as to produce a minimum amount of interference, even though the sources are spaced widely apart. The exact angle employed between the reflectors 32 and 33 is adjusted to suit operating conditions, as will be described, but with the apparatus herein illustrated, the angle included between the axes is roughly 100°. At this angle, the beams have low intensity along the equi-signal line.

A still further modulation arrangement is disclosed in Fig. 10, wherein two of the antennas are energized in unison during one-half of a cycle, while the remaining antennas are then successively energized during one quarter cycle each. The choice as to which antennas to energize simultaneously, depends largely on interference considerations. If any two antennas produce too much interference when operating in unison, they may be energized successively as are the antennas 3 and 4 of Figs. 10 and 10a. Because of the wide spacing between antennas 3 and 4, they are more likely to produce interference than antennas 1 and 2, especially if the patterns overlap to any degree.

The advantages and disadvantages of the foregoing various types of modulation may be summed up as follows: For a minimum amount of interference between the respective patterns, separate modulation periods, as shown in Fig. 8a, may be employed. Where the antennas conveniently can be operated in pairs, as shown in Fig. 9a, the switching cycle is simplified and a greater number of modulated beams may be emitted from a given system, though such an arrangement may produce greater interference effects and may require more careful balancing of the feeder phase relationships. Fig. 10 accordingly shows a compromise arrangement, permitting operation of two antennas simultaneously, with the two remaining antennas operated alternately.

Since one cause of interference resides in the physical spacing of the antennas, even where they are spaced a fraction of a wavelength apart, less difficulty with interference effects may be encountered with the sources located immediately adjacent to one another. Fig. 16 shows such an arrangement with a paraboloidal reflector 21' of the type shown in Fig. 3, but wherein the vertical section enclosed by the spaced partitions 22 as in Fig. 1 is physically removed from the parabola, and the two remaining half sections rejoined with a thin partition 22' therebetween. Each mouth 27 then is spaced transversely from the focus without being physically separated to any degree from the other mouth. Thus both wave guides lie directly against the sides of the partition 22', so that little or no interference action is caused by reflection from that surface. Furthermore, since the radiating sources are located closer together, the beams may operate over a wider included angle without serious interference effects.

Fig. 11 illustrates the crossed-pointer meter current action as the receiver moves in azimuth about the transmitter over an effective range in excess of 180°. The meter action is close to the ideal, in that it provides zero current on the localizer path and linear meter response to departures of several degrees to either side of the localizer path, beyond which departures to either side of the path the meter reading is maintained at full scale, even though current in excess of the full scale current flows in such positions. In Fig. 11 current is measured radially, inwardly or outwardly, to either side of the on-course line. All readings were taken with the receiver at a constant altitude and at a constant distance from the transmitter.

One of the principal advantages to be derived from the four separate antennas utilized to produce the composite patterns 28, 28', and 29, 29', lies in the ease with which the respective components of the entire pattern may be adjusted as to shape, power, and relative orientation so as to eliminate cross-over points and to provide full scale meter deflection for all points disposed beyond several degrees to either side of the localizer path. For the purposes of the present description and claims, the localizer path may be considered as the narrow sector 69 along which the meter reads less than full scale, though in the strict sense of the word, the localizer path represents the straight line along which the crossed-pointer meter current is zero. The principal beams 28 and 29 first are adjusted to provide the desired angular coverage with minimum spurious side lobes, as by adjusting the spacing between the mouths 27, or moving the mouths toward or away from the aperture or opening of the paraboloid. The power to the parabolas 32 and 33 may be controlled by adjusting the probes 66 within chambers 43 and 44, and the orientation of the parabolas relative to one another may be adjusted by moving them on the frame 34 in any convenient manner. The wide angle pattern 28' formed by antenna 4, is oriented until the field strength at all points to the right of the path exceeds a predetermined minimum ratio to the field strength at the corresponding points of the side lobes 71, formed as part of the beam 29 as shown in Fig. 1. Likewise the parabola 32 is adjusted until the power within the pattern provides a field strength exceeding by the same ratio the field strength of the side lobes 72 emanating from the base of pattern 28. With the principal beams 28 and 29 originally oriented properly, the intensity vector contained within the patterns extending principally to one side of the path, e. g. the left beam, never bears a ratio less than a predetermined minimum with respect to the intensity vector at corresponding points contained in the beam extending principally to the other side, e. g. the right beam, which beams, of course, include the side lobes. Since the meter reading in the receiver is a function of this ratio, results similar to that shown in Fig. 11 are obtained under such conditions, that is, the crossed-pointer meter current never dips below full scale when oriented throughout the 90° lying to either side of the localizer path.

Fig. 12 discloses a typical pattern that may be employed for operation of the apparatus through 360° in azimuth. The respective components of the pattern are numbered according to the antennas which produce them. It will be seen that whereas the principal lobes or beams 1' and 2' are similar to the beams 28 and 29 of Fig. 1, the auxiliary beams 3' and 4' extend through substantially 360°. In order to provide a reciprocal path 70, illustrated at 180° opposite to the principal path 31, use is made of an auxiliary antenna system capable of providing directivity patterns having a relatively high intensity along the principal and reciprocal paths. Although a figure-of-8 pattern may be suitable, it is recommended that use be made of cardioids having equi-signal zones extending along the principal path 31 and the reciprocal path 70 as shown in Fig. 12. Apparatus for producing such a pattern is shown in Figs. 13, 14 and 15. The principal beams 1' and 2' may be formed by a paraboloid 21 having radiating portions 23 and 24 in the manner of the apparatus shown in Fig. 3. Instead of employing parabolas 32 and 33, however, use is made of auxiliary radiators 3 and 4 capable of forming the cardioids or equivalent patterns shown in Fig. 12. Typical of such a radiating system is a pair of wave guides 73 and 74 extending vertically adjacent to the paraboloid 21 and having an array of individual antennas 75, extending in axially spaced relation along the length of the wave guides. Each antenna 75 may comprise a dipole 76, the arms 78, 79 of which are bent as indicated in Fig. 14. Each dipole may be energized by a concentric line, the center conductor 77 of which, extends as a probe within the wave guide 73 or 74. Preferably, the antennas are spaced along the wave guide by a distance equal to one-half a wave length, and each alternate antenna is reversed in phase by reversing the legs of the dipole. Accordingly, one dipole is arranged, as shown in Fig. 14, while in the next adjoining dipoles the arm 78 connects with the outer casing, and the arm 79 connects with the center conductor 77. This rearrangement of the dipole arms counteracts the phase displacement encountered between spacing of the antennas along the wave guide, so that all antennas thereby act in phase. It is obvious that any other antenna arrangement may be substituted for the cardioid-producing arrangement shown in Figs. 13 and 15. The antennas are energized in any suitable manner, and preferably in the manner described in connection with the form of the invention shown in Figs. 3, 4 and 5.

It is believed that the intensity of some of the side lobes may be reduced by minimizing any surfaces in front of the reflector that might serve as secondary sources of radiant energy. As an example, the portions of the wave guides 25, 26 that extend upwardly adjacent to the mouth of the reflector, as shown in Figs. 13 and 15, provide surfaces against which energy from the antennas 1 and 2 may strike and from which the energy may be deflected for reradiation by the paraboloid. Since the reradiated energy does not originate from a point adjacent the focus, undesirable side lobes may result. This difficulty has been overcome, as shown in Figs. 17 and 18, by separating the partitions 83 and 84 a distance sufficient to permit the passage therebetween of the energy conduit means. As shown in drawings, use may be made of conventional wave guides 81 and 82 of the usual oblong cross-section. These guides may extend through the back of the paraboloid 21 adjacent to its vertex, and may extend as shown between the partitions with the longer sides of the wave guides parallel to the partitions, and with one long side of each wave guide abutting the other. As in the previous examples, the partitions 83 and 84 preferably extend substantially diametrically across the circular opening or mouth 85, and preferably the planes defining the partitions are parallel to the paraboloidal axis.

Energy conducted through the wave guides 81 and 82 passes through a reversing turn 86 at the end of each wave guide by which the energy is emitted in a direction so as to project against the concave surface. It will be apparent that as far as individual portions 23 and 24 are concerned, no sources of secondary radiation are present, since the only surface projecting into the portions 23 and 24 are the mouth portions of the reversing turns 86.

It may be desirable to provide an asymmetrical distribution of the energy, so that a portion of the energy is scattered more generally in a vertical or other direction. This is obtainable by shaping a concave reflector 88 in the manner shown in Fig. 19. Although the principles are applicable equally well to parabolic, paraboloidal, or similar shaped reflectors, the antenna of Fig. 19 will be described specifically as a radiator of a modified paraboloidal type. The asymmetrical distribution is obtained by modifying the shape of the respective portions of the radiators so as to deflect portions of the energy in the desired direction. As a specific example, the radiator 88 may comprise a concave reflector having a surface of revolution of parabolic or modified parabolic shape. The lower portion may be tilted relative to the upper portion, or the curve otherwise shaped to deflect part of the energy upwardly. The upper half may have a focus 89 at a predetermined distance from the vertex 91, while the lower half may comprise a more abrupt curve of any desired pattern having a focus 92 closer to the vertex than focus 89. Such a reflector concentrates the energy at low angles to a greater degree than at higher angles.

Any conventional receiver may be used on the craft to be guided along the course, and the control provided may be manual as by indicating the craft position to the pilot as by a meter reading, or automatically as by feeding the meter information directly to signal input circuits of the rudder or elevator controls, as the case may be, of an automatic pilot. A system of the present type has been used effectively as a warning beacon to guide a pilot through or over a dangerous course, and when operated on microwaves, is not affected to any material degree by atmospheric disturbances. The system may be used for takeoffs of airplanes as well as for landings, and has a useful range of over one-hundred miles due to large energy concentration produced by sharp beams. On a number of landings made at a point 3500 feet from the localizer radiating array, the aircraft always contacted the ground within six feet of the centerline of the runway, thus illustrating that landings may be made consistently within close limits. Such overall system sensitivity is attributable to the high concentration of the beam power to within a small arc, made possible by the separate side beams, and to the relatively large signal differential resulting from a slight change in aircraft position.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A directive radiator of electromagnentic energy comprising a concave reflector, an electrically conductive partition extending perpendicularly from the concave surface of said reflector for dividing said reflector into two adjoining portions, and energizing means for directing distinctively characterized electromagnetic energy into each of said portions, respectively, the energizing means for each of said portions being separated in opposite directions from the focus of said reflector along a diameter perpendicular to said partition.

2. A directive radiator of electromagnetic energy comprising a reflector having a concave surface of revolution, an electrically conductive partition extending perpendicularly from the concave surface of said reflector for dividing said reflector into two adjoining portions, and energizing means for directing electromagnetic energy into each of said portions, said energizing means being disposed adjacent to opposite sides of said partition, and respectively displaced from the focus of said reflector.

3. A directive radiator of electromagnetic energy comprising a concave reflector, an electrically conductive partition extending perpendicularly from the concave surface of said reflector for dividing said reflector into two adjoining portions, and energizing means for directing electromagnetic energy into each of said portions, said energizing means comprising wave guides extending along the sides of said partition and having a mouth emptying into said respective portions.

4. A directive electromagnetic energy transducer comprising a concave paraboloidal reflector, a conductive partition dividing said reflector into two adjoining symmetrical portions and a pair of energy emitters located on opposite sides of said partition, said emitters being separated in opposite directions from the focus of said reflector along a diameter perpendicular to said partition.

5. A directive electromagnetic energy transducer comprising a concave paraboloidal reflector, a conductive partition dividing said reflector into two adjoining symmetrical portions, and a pair of wave guides disposed on opposite sides of said partition and having mouths directed toward said reflector.

6. A directive electromagnetic energy transducer comprising a concave paraboloidal reflector, a conductive partition dividing said reflector into two adjoining symmetrical portions and a pair of wave guides disposed on opposite sides of said partition and having mouths directed toward said reflector, each of said mouths being separated in opposite directions from the focus of said reflector along a diameter perpendicular to said partition to provide angular separation of the directivity patterns produced by said respective portions.

7. A directive radiator of electromagnetic energy for producing overlapping directivity patterns, comprising a concave parabolic reflector, electrically conductive partition means extending substantially prependicularly from the concave surface of said reflector along planes spaced from the parabolic focus and extending perpendicular to a parabolic directrix for dividing said radiator into two separate portions, and energy emitters separated in opposite directions from the focus of said reflector along a diameter perpendicular to said partition means for directing said energy toward said portions.

8. A directive localizer and radio range antenna system, comprising a paraboloidal reflector located with its axis inclined to the horizontal at an angle of the order of several degrees, a vertical partition dividing said reflector into two symmetrical portions, electromagnetic energy emitters displaced horizontally from the reflector axis for projecting electromagnetic waves into each of said portions to form a pair of adjoining beams diverging slightly to either side of the reflector axis, a pair of concave reflectors each located with its axis inclined to the horizontal at an angle of the order of several degrees having an aperture height substantially equal to the diameter of the paraboloidal aperture and having an aperture width narrow enough to provide a relatively wide angle beam in azimuth, said concave reflectors being oriented in azimuth with approximately 90° included between their axes.

9. A directive electromagnetic energy transducer comprising a concave paraboloidal reflector, a conductive partition dividing said reflector into two adjoining symmetrical portions and a pair of wave guides disposed on opposite sides of said partition and having mouths directed toward said reflector, each of said mouths being adjustable outwardly from the focus of said antenna to control said angular separation.

10. A radio range and an instrument landing localizer beam antenna system comprising a source of radio frequency energy, a first pair of directive radiators for forming overlapping principal lobes producing high-intensity narrow-angle radiation, a second pair of directive radiators for forming auxiliary lobes producing low intensity wide-angle radiation, and means for energizing said first and second pairs of radiators with said radio frequency energy in spaced time relationship.

11. An instrument landing localizer beam antenna system comprising a first pair of directive radiators for forming overlapping principal lobes producing high-intensity narrow-angle radiation, and a second pair of directive radiators for forming auxiliary lobes producing low intensity wide-angle radiation, and means for conducting radio-frequency energy to each of said radiators in succession.

12. An instrument landing localizer beam antenna system comprising a first pair of directive radiators for forming overlapping principal lobes producing high-intensity narrow-angle radiation, and a second pair of directive radiators for forming auxiliary lobes producing low intensity wide-angle radiation, and means for conducting radio-frequency energy to each of said one pair of directive radiators in succession, and then to each of said other pair of directive radiators in succession, as a recurrent cycle.

13. An instrument landing localizer beam antenna system comprising a pair of highly directive radiators for forming narrow-angle overlapping principal beams whose equi-signal zone defines a localizer path, a pair of less-directive radiators for forming an auxiliary wide angle beam at opposite sides of said zone, and modulating means including means for modulating one of said principal lobes and one of said auxiliary lobes in a manner distinct from the modulation of the remaining lobes.

14. A system as claimed in claim 13 including switching means for conducting the modulated energy to each of said radiators in succession.

15. An instrument landing localizer beam emitting system having characteristically modulated right and left side directivity patterns whose equi-signal zone defines a localizer path, said system comprising means for directing a pair of concentrated beams of radio-frequency energy at angles diverging slightly in opposite directions from said path, and means for directing at said frequency separate radio-frequency energy beams at low intensity over a large angle extending in opposite directions from the outer extremities of said concentrated beams.

16. A directive radiator of electromagnetic energy for providing a sharply defined equi-signal path and right-left indication of over at least a straight angle, said radiator comprising means for producing crossed distinctively-modulated principal radio beams having an included angle between the outermost half power points of less than twenty degrees, and auxiliary means for producing similarly distinctively-modulated diverging auxiliary radio beams for extending the angular range, said auxiliary beams extending from the respective principal beams and having an included angle between the outermost half power points of substantially a straight angle.

17. A directional antenna system for providing an equi-signal path with relatively strong signals in the region of the path and relatively weak signals at large angular deviations therefrom, said system comprising a pair of highly-directive radiators with directivity axes disposed at several degrees to either side of said path, and a pair of less directive radiators with directivity axes disposed at approximately half a right angle to either side of said path.

18. A directional antenna system for providing an equi-signal path with relatively strong signals in the region of the path and relatively weak signals at large angular deviations therefrom, said system comprising a pair of highly-directive radiators with directivity axes disposed at several degrees to either side of said path, and a pair of less directive radiators with directivity axes disposed at approximately half a right angle to either side of said path, an energy source, and means for modulating the energy conducted to one of each pair of said radiators in a manner distinctive from the other of each pair of said radiators.

19. A system as claimed in claim 18 including switch means for interrupting the flow of the respectively modulated portions of said energy alternately.

20. A directional antenna system for providing an equi-signal path with relatively strong signals in the region of the path and relatively weak signals at large angular deviations therefrom, said system comprising a pair of highly-directive radiators with directivity axes disposed to form principal beams mutually divergent slightly to either side of said path, a pair of less-directive radiators with directivity axes arranged more divergently so as to dispose resultant auxiliary beams alongside of said principal beams, and means for energizing said radiators so that the field strength radius vector of the principal and auxiliary beams at all points on each side of said path exceeds by a predetermined minimum ratio the field strength radius vector of all spurious side lobes at corresponding points.

21. A directional antenna system for providing an equi-signal path with relatively strong signals in the region of the path and relatively weak signals at large angular deviations therefrom, said system comprising a pair of highly-directive radiators with directivity axes disposed to form principal beams mutually divergent slightly to either side of said path, a pair of less-directive radiators with directivity axes arranged more divergently so as to dispose resultant auxiliary beams alongside of said principal beams with coverage over at least a straight angle, and means for energizing said radiators so that the field strength radius vector of one of the respective right and left beams, each formed of a principal and auxiliary beam, at all points on the respective sides of said path exceeds by a predetermined minimum ratio the field strength radius vector of the other right and left beam at corresponding points, said energizing means including switching means for providing energy to each of said respective radiators separately during successive periods of a recurrent cycle.

22. A directional antenna system for providing an equi-signal path with relatively strong signals in the region of the path and relatively weak signals at large angular deviations therefrom, said system comprising a pair of highly directive radiators with directivity axes disposed to form principal beams mutually divergent slightly to either side of said path, a pair of less directive radiators with directivity axes arranged more divergently so as to dispose resultant auxiliary beams alongside of said principal beams with coverage over at least a straight angle, and means for energizing said radiators so that the field strength radius vector of one of the respective right and left beams, each formed of a principal and auxiliary beam, at all points on the respective sides of said path exceeds by a predetermined minimum ratio the field strength radius vector of the other right and left beam at corresponding points, said energizing means including switching means for providing energy to said highly directive radiators in unison over a portion of a recurrent cycle, and to said respective less directive radiators in succession during the remainder of said cycle.

23. A directional antenna system for providing an equi-signal path with relatively strong signals in the region of the path and relatively weak signals at large angular deviations therefrom, said system comprising a paraboloidal reflector having a diametrical partition dividing said reflector into two symmetrical portions, electromagnetic energy emitters for projecting electromagnetic waves into each of said portions to form a pair of radiation patterns extending from said reflector in overlapping relation on opposite sides of a predetermined path defined by the equi-signal zone of said patterns, a pair of cylindrical parabolic reflectors disposed with their axes diverging on opposite sides of said zone and having side faces forming an included angle of the order of a right angle, and energy emitters for feeding radio-frequency energy to said parabolic reflectors.

24. A system as claimed in claim 23 including means for successively energizing each of said emitters separately during a recurrent cycle.

25. A directive antenna system comprising means for forming a pair of slender beams of electromagnetic energy overlapping in substantially a horizontal plane, the equi-signal axis of which beam defines a principal path, means for forming a pair of opposed generally cardioidal shaped beams overlapping in substantially a horizontal plane with their symmetry axes each at substantially a right angle to said path, and means for energizing said respective radiation means so that the average field strength within said cardioidal beams is appreciably lower than the average field strength within said slender beams, said cardioidal patterns having overlapping portions opposite said path to provide an equi-signal axis defining a reciprocal path.

26. A localizer antenna system, comprising a paraboloidal reflector located with its axis inclined to the horizontal at an angle of the order of several degrees, a vertical partition dividing said reflector into two symmetrical portions, electromagnetic-energy emitters displaced horizontally from the reflector axis for projecting electromagnetic waves into each of said portions to form a pair of adjoining beams diverging slightly to either side of the reflector axis, a pair of cylindrical parabolic reflectors each located with its axis inclined to the horizontal at an angle of the order of several degrees having an aperture height substantially equal to the diameter of the paraboloidal aperture, said system including commutating means for recurrently supplying radio frequency energy from said energizing means to each of said radiating means separately in succession.

27. A localizer antenna system, comprising a paraboloidal reflector located with its axis inclined to the horizontal at an angle of the order of several degrees, a vertical partition dividing said reflector into two symmetrical portions, electromagnetic energy emitters displaced horizontally from the reflector axis for projecting electromagnetic waves into each of said portions to form a pair of adjoining narrow principal beams diverging slightly to either side of the reflector axis, a pair of divergently positioned cylindrical parabolic reflectors each located with its axis inclined to the horizontal at an angle of the order of several degrees having an aperture height substantially equal to the diameter of the paraboloidal aperture for forming wide-angle beams lying on opposite sides of said principal beams, said system including means for energizing each of said reflectors so that each resultant beam comprising one narrow beam and the adjoining wide-angle beam provides at all positions outside of the principal beam as a field strength exceeding by at least a predetermined ratio the field strength of the other resultant beam.

28. A directive antenna system providing radio signals defining an equi-signal path extending from said system, comprising radiator means for generating a pair of high-intensity beams having a width of less than 10° at the half-power points and having axes diverging to the right and left respectively of said path, and for generating at substantially the same power input a pair of wide angle beams having axes extending to the right and left respectively of said path, conduit means for conducting radio frequency energy to said radiator means, and modulator means for modulating the energy radiated in both right beams in a manner distinctive from the energy radiated in both left beams.

29. A directive antenna system providing radio signals defining an equi-signal path extending from said system, comprising radiator means for generating a pair of high-intensity beams having a width of less than 10° at the half-power points and having axes diverging to the right and left respectively of said path, and for generating at substantially the same power input a pair of wide angle beams having axes extending to the right and left respectively of said path, conduit means for conducting radio frequency energy to said radiator means, and modulator means for modulating the energy radiated in both right beams in a manner distinctive from the energy radiated in both left beams, said modulator means including swith means for rendering successive beams intermittently inoperable.

30. A directive antenna system providing radio signals defining an equi-signal path extending from said system, comprising radiator means for generating a pair of high-intensity beams having a width of less than 10° at the half-power points and having axes diverging to the right and left respectively of said path, and for generating at substantially the same power input a pair of wide angle beams having axes extending to the right and left respectively of said path, conduit means for conducting radio frequency energy to said radiator means, and modulator means for modulating the energy radiated in both right beams in a manner distinctive from the energy radiated in both left beams, said modulator means including switch means for rendering each of said respective beams individually operative during successive portions of a recurrent cycle.

31. A directive antenna system providing radio signals defining an equi-signal path extending from said system, comprising radiator means for generating a pair of high intensity beams having a width of less than 10° at the half-power points, and having axes diverging to the right and left respectively of said path, and for generating at substantially the same power input a pair of wide angle beams having axes extending to the right and left respectively of said path, conduit means for conducting radio frequency energy to said radiator means, and modulator means for modulating the energy radiated in both right beams in a manner distinctive from the energy radiated in both left beams, each of said wide angle beams being oriented relative to said other beams so that the vectorial sum of the field intensities of the right beams exceeds by a predetermined minimum ratio at all points on the right of said path the corresponding sum of the field intensities of the left beams at the same points, and conversely, so that the vectorial sum of the field intensities of the left beams exceeds by a predetermined minimum ratio at all points on the left side of said path the corresponding sum of the field intensities of the left beams at the same points.

32. A directive antenna system comprising means for forming a pair of slender beams of electromagnetic energy overlapping in substantially a horizontal plane, the equi-signal axis of which beam defines a principal path, means for forming a pair of wide angle beams having portions overlapping to form a reciprocal path substantially 180° from said principal path, and means for modulating the energy forming each slender beam and the adjoining wide angle beam in a manner distinctive from the remaining beams.

33. A directive antenna system comprising means for forming a pair of slender beams of electromagnetic energy overlapping in substantially a horizontal plane, the equi-signal axis of which beam defines a principal path, means for forming a pair of wide angle beams having portions overlapping to form a reciprocal path substantially 180° from said principal path, and means for modulating the energy forming each slender beam and the adjoining wide angle beam in a manner distinctive from the remaining beams, said system including a modulator for shutting off all but one of said respective beams successively during a recurrent cycle.

34. A radio frequency modulator, a wheel having teeth formed about a portion of its periphery, means for rotating said wheel at a uniform rate, a pair of resonators having input and output connections for extending to a source of energy and a load circuit respectively, said resonators comprising chambers disposed at diametrically opposite points of said wheel, said chambers having a wall member apertured to receive said periphery of said wheel, said respective teeth being cooperative with said respective chambers as said wheel rotates to tune and detune each said resonator alternately during equally spaced periods of each cycle of rotation.

35. A radiator of an electromagnetic energy beam, comprising a concave generally paraboloidal reflector, a generally diametrical partition dividing said paraboloid into two portions, an energy emitter for discharging electromagnetic energy into one of said portions, thereby to form a beam oriented relative to said axis, and means for controlling the orientation of said beam comprising mounting means for varying the location of said emitter in a direction parallel to the axis of said paraboloidal reflector.

36. A radiator of electromagnetic energy comprising a reflector having a concave surface of revolution, a pair of spaced partitions extending substantially diametrically across said reflector, energy emitting means for projecting energy toward said reflector, and energy conduit means extending between said partitions toward said emitting means.

37. A radiator of electromagnetic energy comprising a reflector having a concave surface of revolution, a pair of spaced partitions extending substantially diametrically across said reflector, and wave guides extending through said partition, each of said guides having a mouth disposed so as to project energy toward said concave surface.

38. A radiator of electromagnetic energy comprising a reflector having a concave surface revolved about the axis of said reflector, a pair of spaced parallel partitions extending across said reflector parallel to said axis, a pair of wave guides extending through the vertex of said reflector and between said partitions substantially along said axis, each of said wave guides being provided with a reversing turn having a discharge opening for projecting electromagnetic energy against said surface.

39. A radiator as claimed in claim 38, wherein said wave guides are oblong in cross section and wherein said wave guides are disposed adjacent to one another with the longer sides thereof parallel to said partitions.

40. A radiating system for forming a pair of overlapping beams of electromagnetic energy defining an equi-signal path, said system comprising a pair of highly directional radiators for forming a component of each of said beams, and a pair of less directional radiators for forming another component of each of said beams, and modulator means for feeding characteristically-modulated electromagnetic energy to each of said radiators in succession.

41. A directive radiator of electromagnetic energy comprising a concave reflector, an electrically conductive partition extending perpendicularly from the concave surface of said reflector for dividing said reflector into two adjoining portions, and energizing means for each of said portions respectively separated in opposite directions from the focus of said reflector along a diameter perpendicular to said partition for directing differently modulated electromagnetic energy into each of said portions.

GEORGE B. LITCHFORD.
WILLIAM BALDWIN DAY.

REFERENCES CITED

The following references are of record in the file of this patent:

UNITED STATES PATENTS

| Number | Name | Date |
|---|---|---|
| 1,235,275 | Wood | July 31, 1917 |
| 2,155,821 | Goldsmith | Apr. 25, 1939 |
| 2,217,321 | Runge et al. | Oct. 8, 1940 |
| 2,279,031 | Cockerell et al. | Apr. 7, 1942 |
| 2,283,897 | Alford | May 26, 1942 |

FOREIGN PATENTS

| Number | Country | Date |
|---|---|---|
| 114,368 | Australia | Dec. 24, 1942 |
| 706,446 | France | Mar. 30, 1931 |
| 802,756 | France | June 13, 1936 |